(12) United States Patent
Chu

(10) Patent No.: US 8,115,743 B2
(45) Date of Patent: Feb. 14, 2012

(54) TERMINAL WITH TOUCH SCREEN AND METHOD FOR INPUTTING MESSAGE THEREIN

(75) Inventor: Se Youp Chu, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 12/291,422

(22) Filed: Nov. 10, 2008

(65) Prior Publication Data

US 2009/0122025 A1    May 14, 2009

(30) Foreign Application Priority Data

Nov. 13, 2007    (KR) .................. 10-2007-0115260

(51) Int. Cl.
*G06F 3/041*    (2006.01)

(52) U.S. Cl. ........................................ 345/173; 345/174
(58) Field of Classification Search ....................... None
See application file for complete search history.

(56) References Cited

U.S. PATENT DOCUMENTS

2007/0254722 A1* 11/2007 Kim et al. ................ 455/566
2008/0303796 A1* 12/2008 Fyke ......................... 345/173

* cited by examiner

*Primary Examiner* — Muhammad N Edun

(57) ABSTRACT

A terminal with a touch screen and a method for inputting a message therein are provided. The method includes: arranging at least two letters allocated to a key area of the touch screen in a message input mode and displaying the letters in the key area; determining whether a touch-flick is sensed in the key area of the touch screen; and displaying, if a touch-flick is sensed, a letter arranged in the key area in a direction of the touch-flick, in a message display area. Accordingly, a user can compose a message by inputting a desired letter without requiring multiple touches.

12 Claims, 6 Drawing Sheets

TERMINAL WITH TOUCH SCREEN AND METHOD FOR INPUTTING MESSAGE THEREIN

CROSS-REFERENCE TO RELATED APPLICATION(S) AND CLAIM OF PRIORITY

This application claims priority to an application entitled "TERMINAL WITH TOUCH SCREEN AND METHOD FOR INPUTTING MESSAGE THEREIN" filed in the Korean Intellectual Property Office on Nov. 13, 2007 and assigned Serial No. 2007-0115260, the contents of which are incorporated herein by reference.

TECHNICAL FIELD OF THE INVENTION

The present invention relates to a terminal with a touch screen and a method for inputting a message therein and, more particularly, to a terminal with a touch screen and a method for inputting a letter of a message in a touch direction sensed through the touch screen.

BACKGROUND OF THE INVENTION

Various types of terminals have recently been developed according to improvements in information communication technologies, and the designs thereof become diverse according to users' diverse demands. In particular, a touch screen simultaneously performs a display function for displaying an operational state of a terminal and an input function for inputting data, thereby reducing the size of a terminal. Also, a user can easily confirm the operational state of the terminal.

Such a terminal may have various functions for transmitting and receiving data in addition to other functions. Terminal functions may include, for example, a camera function, a wireless Internet function, a DMB (digital multimedia broadcasting) function, a phone function, or a message transmitting and receiving function. Particularly, the message transmitting and receiving function is popular with many users.

However, in a conventional terminal with a touch screen, a user should touch a key area displayed on the touch screen, often multiple times, until a desired letter is displayed for a message.

Also, when a user wants to touch a key area having a desired letter in the key area on the touch screen, the user may unintentionally touch another key area adjacent to the key area having the desired letter.

SUMMARY OF THE INVENTION

To address the above-discussed deficiencies of the prior art, it is a primary object of the present invention to provide a terminal with a touch screen and a method for inputting a letter of a message without requiring multiple touches.

In an exemplary embodiment of the present invention, a method for inputting a letter of a message in a terminal with a touch screen includes: arranging at least two letters allocated to a key area of the touch screen in a message input mode and displaying the letters in the key area; determining whether a touch-flick is sensed in the key area of the touch screen; and displaying, if a touch-flick is sensed, a letter arranged in the key area in a direction of the touch-flick, in a message display area.

In another exemplary embodiment of the present invention, a terminal includes: a touch screen for displaying a key display area and a message display area, wherein the key display area displays a plurality of key areas, to each of which at least two letters are allocated, and senses a touch and a touch-flick, and wherein the message display area displays a letter selected from one of the key area; and a controller for arranging the at least two letters allocated to the key area in a message input mode, and for instructing, if a touch-flick is sensed in the key area, the touch screen to display, in the message display area, a letter arranged in the key area in a direction of the touch-flick.

According to the present invention, a user can compose a message by inputting a desired letter without requiring multiple touches on a key area having a desired letter. Also, the user can avoid touching a key area other than the key area having a desired letter.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged touch screen terminal.

In the following exemplary embodiments, a 'terminal' refers to an information processing device for storing data and transmitting and receiving data. The terminal may be a computer, a PDA (personal data assistant) or a mobile terminal.

The mobile terminal is exemplified in the description of the exemplary embodiments of the present invention.

A 'message input mode' refers to a mode in which letters input through an input unit are combined to generate data. In the message input mode, a user may compose a short message, a multimedia message, an instant message or an e-mail, and may also compose a file title or message for storage.

A 'letter' is a basic writing unit of a written language for use in a terminal (for example, an alphabetic letter in English, or a character of a consonant or vowel in Korean). The language may be set among a variety of languages. English is exemplified in the description of the exemplary embodiments of the present invention. The letter may also be a numeral.

A 'touch' refers to a motion in which a user contacts a specific area on a touch screen with a finger or a stylus and then directly withdraws the contacting finger or stylus from the area.

A 'touch-flick' refers to a motion in which a user contacts a specific area on a touch screen with a finger or a stylus and then withdraws the finger or the stylus from the area while simultaneously moving the finger or the stylus in a specific direction along the touch screen.

Figure 1:
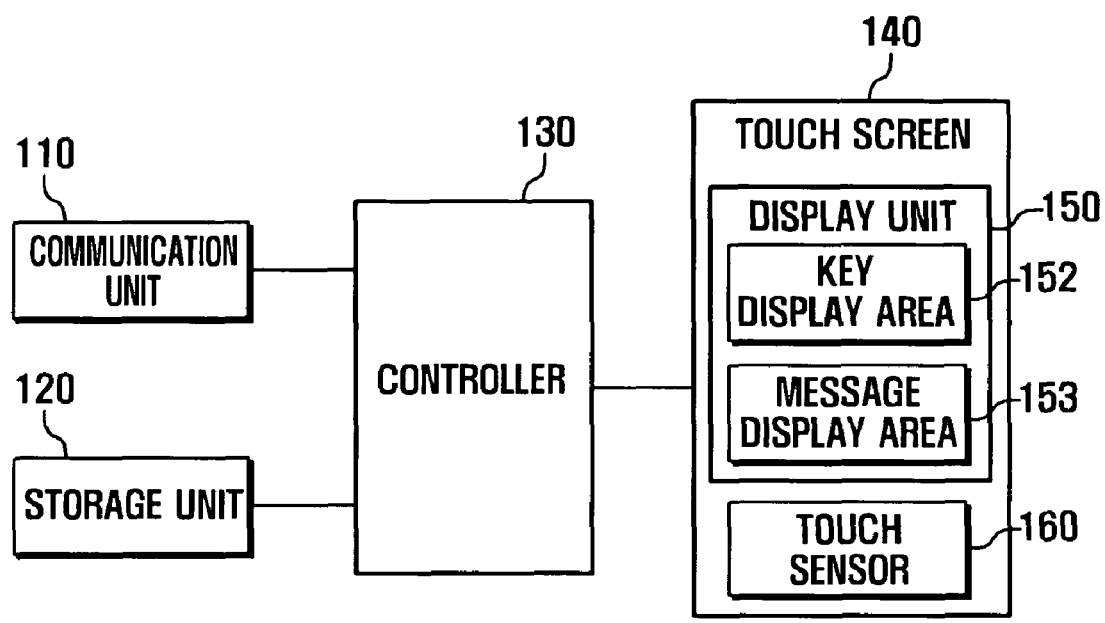
FIG. 1 is a block diagram illustrating a configuration of a terminal according to an exemplary embodiment of the present invention.

FIG. 1 is a block diagram illustrating a configuration of a terminal according to an exemplary embodiment of the present invention.

Figure 3:
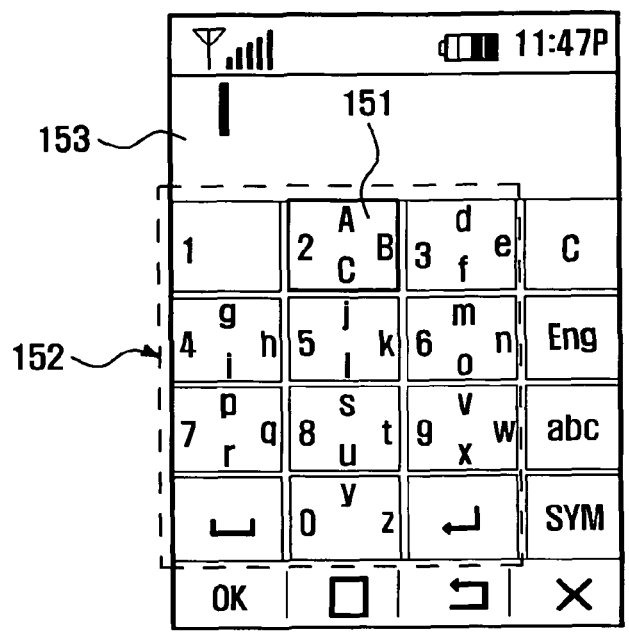
FIG. 3 is an example of a screen in which letters are arranged in a polygonal pattern in the method of FIG. 2.

Referring to FIGS. 1 and 3, a terminal includes a communication unit 110, a storage unit 120, a controller 130 and a touch screen 140.

The communication unit 110 performs radio frequency communication between the terminal and a base station. The communication unit 110 may include a duplexer for separating received signals and for separating signals to be transmitted, a transmitter for up-converting a frequency of a signal to be transmitted, and a receiver for down-converting a frequency of a received signal.

The storage unit 120 stores various programs for controlling operations of the terminal and various data generated in the operations of the terminal. Also, the storage unit 120 stores positions of letters and symbols allocated to a key area 151 of the touch screen 140.

The controller 130 controls the overall operations of the terminal. In particular, when a message input mode is selected, the controller 130 instructs the touch screen 140 to display the key area 151 in which at least two letters are arranged. At this time, the controller 130 controls the display if the letters arranged in a polygonal pattern on the key area 151 of the touch screen 140. The polygonal pattern may be, for example, a diamond-shaped pattern or a rectangular-shaped pattern, and may be set by a terminal manufacturer or a user. Further, the controller 130 displays symbols in response to a touch sensed through the touch screen 140 and displays a selected letter on a message display area 153.

The touch screen 140 includes a display unit 150 and a touch sensor 160. The display unit 150 includes a key display area 152 and the message display area 153, and displays information about operational states of the terminal. When the message input mode is selected, the display unit 150 of the touch screen 140 displays the key area 151 in which letters are arranged in the key display area 152 and displays the message display area 153 for displaying a selected letter under the control of the controller 130. At least two letters are allocated to each key area 151 displayed on the display unit 150 of the touch screen 140. Further, various symbols are allocated to specific key areas 151. A 'symbol' refers to a non-letter character (for example, a question mark and an exclamation mark in the English language). The symbols in the key area 151 may be set by a terminal manufacturer or a user.

The touch sensor 160 is installed in the display unit 150. The touch sensor 160 senses a touch generated on the display unit 150 and then detects a location of an area in which the touch is generated. The touch sensor 160 transmits the detected location to the controller 130 to perform a function corresponding to the touched area. Further, if a touch-flick for a specific area is sensed, the touch sensor 160 determines a direction of movement of the touch-flick and transmits the direction to the controller 130.

In the mobile terminal having the above-described configuration, if the message input mode is selected, the controller 130 instructs the touch screen 140 to display the key area 151 in which letters are arranged in a polygonal pattern in the key display area 152 and to display the message display area 153 for displaying a selected letter. If a touch-flick is sensed through the touch screen 140, the controller 130 confirms a moving direction of the touch-flick and displays a letter corresponding to the moving direction of the touch-flick among the letters in the key area 151 in which the touch-flick is sensed, in the message display area 153.

Figure 2:
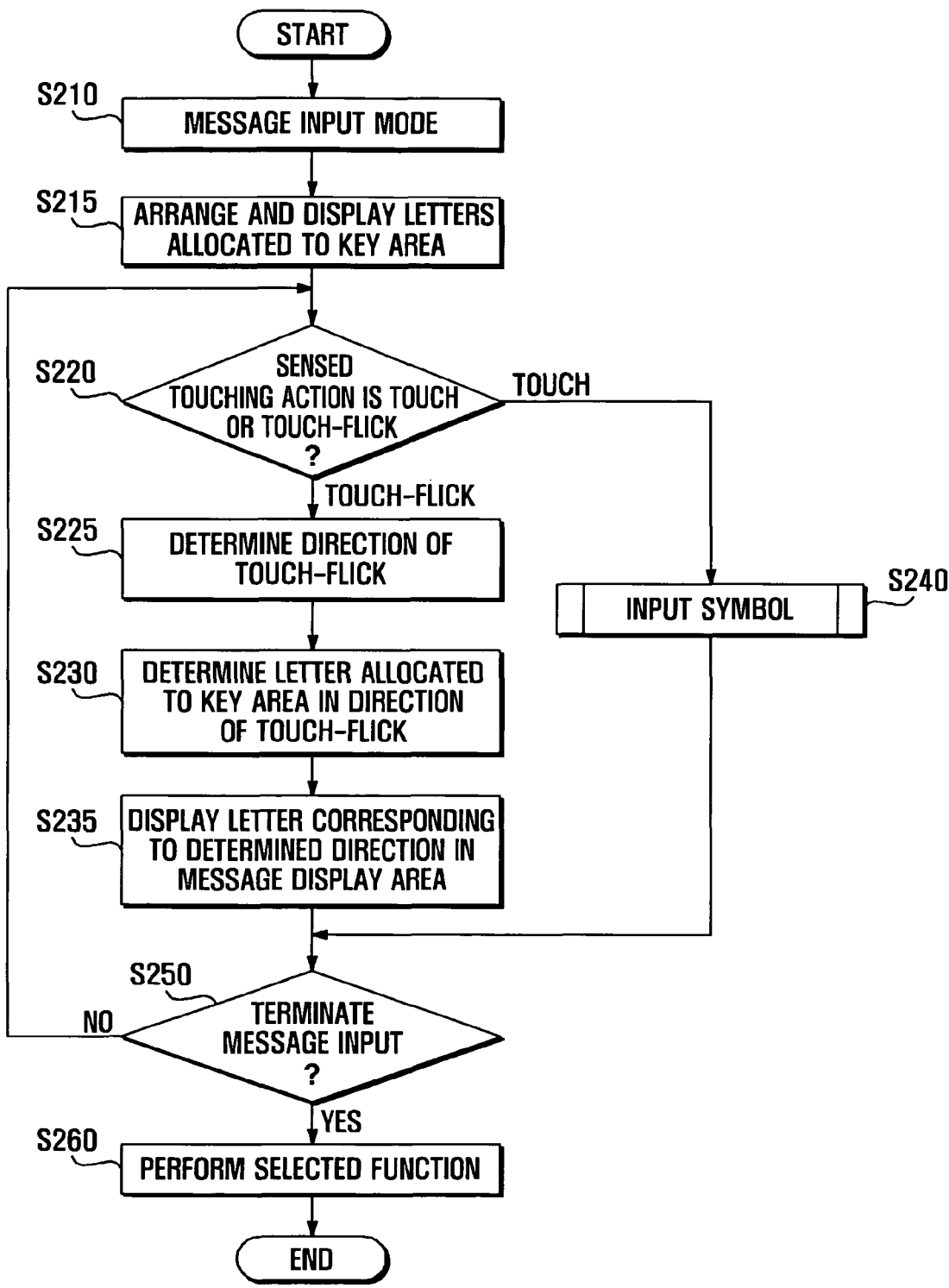
FIG. 2 is a flowchart illustrating a method for inputting a letter of a message according to another exemplary embodiment of the present invention.
Figure 4A:
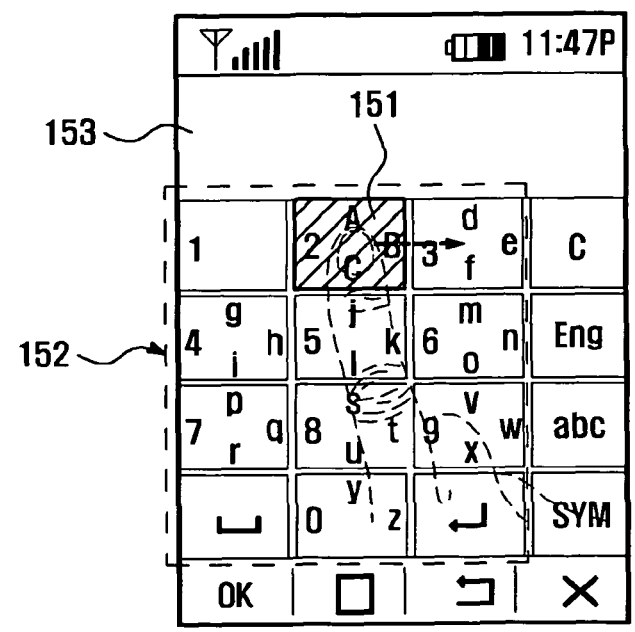
FIGS. 4A and 4B are examples of a screen illustrating a process of inputting a letter in the method of FIG. 2.
Figure 4B:
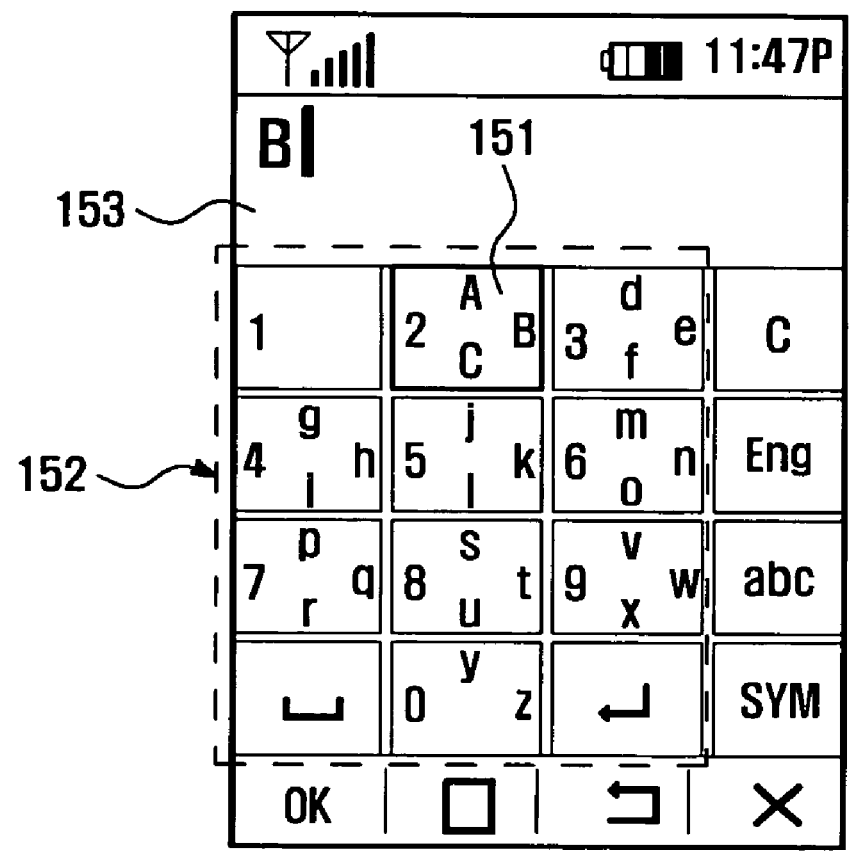
Figure 5:
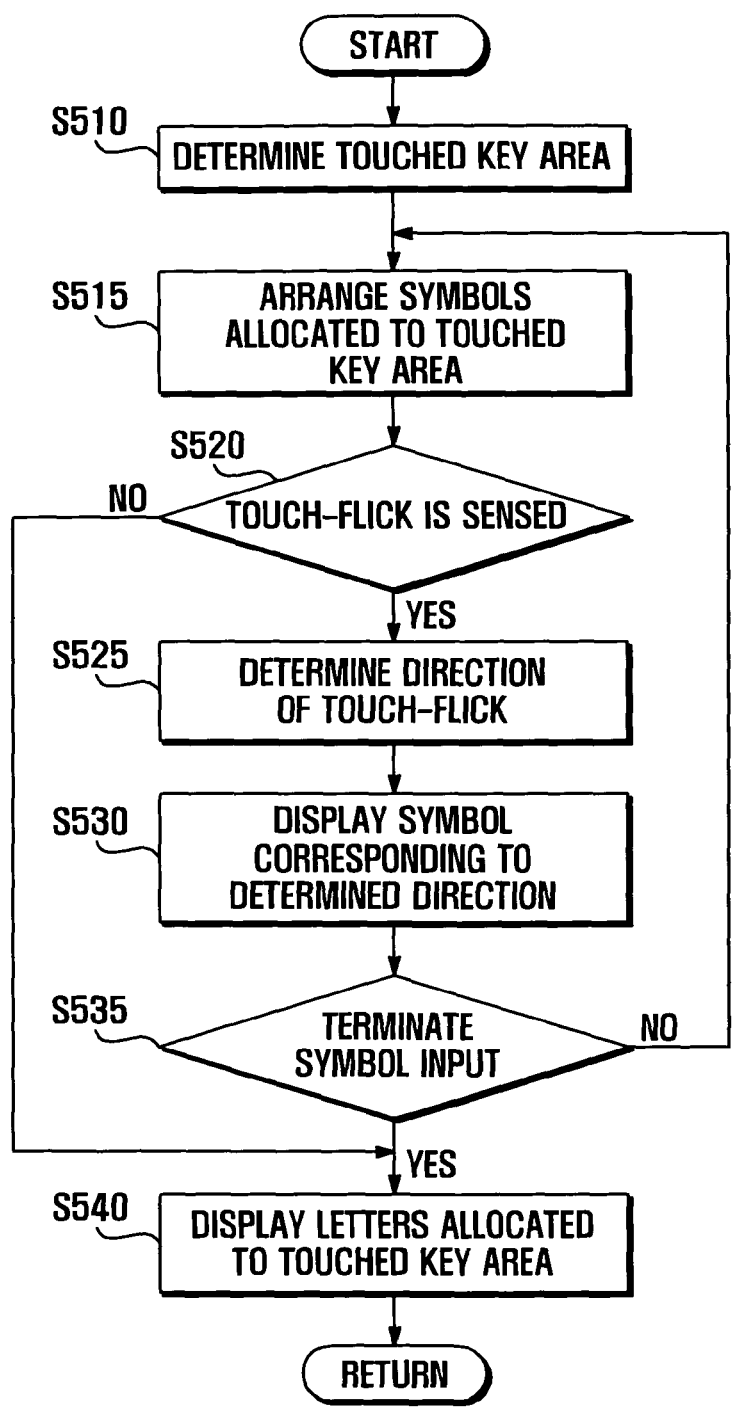
FIG. 5 is a flowchart illustrating a process of inputting a symbol in the method of FIG. 2.
Figure 6:
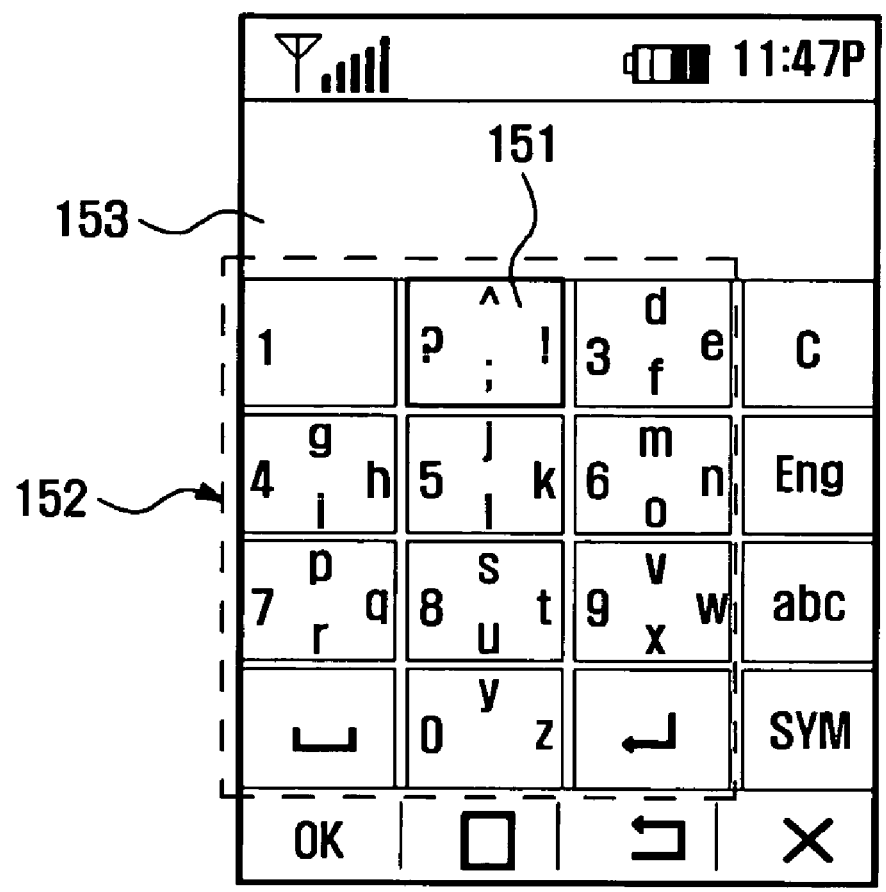
FIG. 6 is an example of a screen in which symbols are arranged in a polygonal pattern in the process of FIG. 5.

Hereinafter, a message input method according to another exemplary embodiment of the present invention is described with reference to FIGS. 2 to 6. FIG. 2 is a flowchart illustrating a method for inputting a letter of a message according to another exemplary embodiment of the present invention; FIG. 3 is an example of a screen in which letters are arranged in a polygonal pattern in the method of FIG. 2; FIGS. 4A and 4B are examples of a screen illustrating a process of inputting a letter in the method of FIG. 2; FIG. 5 is a flowchart illustrating a process of inputting a symbol in the method of FIG. 2; and FIG. 6 is an example of a screen in which symbols are arranged in a polygonal pattern in the process of FIG. 5.

Referring to FIG. 2, when a user selects a message input mode to input a letter of a message through a menu or a function key, the controller 130 senses the selection and converts a mode of a terminal into the message input mode (S210).

The controller 130 displays the key area 151 in which allocated letters are arranged and the message display area 153 for displaying a selected letter on the touch screen 140 (S215). The controller 130 may arrange the letters allocated to the key area 151 in various patterns (for example, in a diamond-shaped pattern, as shown in FIG. 3). In the present embodiment, at least two letters may be allocated to each key area 151, and the letters allocated to each key area 151 are spaced equidistant from a center of the corresponding key area 151. The pattern may also be rectangular-shaped, wherein a letter is arranged at each of the four corners of the key area 151.

The controller 130 determines, when a touching action of a user on the touch screen 140 is sensed, whether the touching action is a touch or a touch-flick (S220). The controller 130 determines, if a touch-flick is sensed, a direction of the sensed touch-flick (S225). The controller 130 then determines letters allocated to the key area 151 in which the touch-flick is sensed (S230), and displays a letter corresponding to the direction of the touch-flick among the allocated letters on the message display area 153 (S235).

Hereinafter, steps S225 to S235 are described in more detail with reference to FIGS. 4A and 4B. Referring to FIG. 4A, a user touch-flicks the touch screen 140 in the key area 151 having a letter 'B' towards the right side at which the letter 'B' is arranged, so as to input the letter 'B'. The controller 130 senses the touch-flick generated through the touch screen 140 and determines that the direction of the sensed touch-flick is rightwards. Next, the controller 130 confirms that a numeral '2' and letters 'A', 'B' and 'C' are allocated to the key area 151 in which the touch-flick is sensed, and determines that the letter 'B' is arranged at the right side of the key area 151. The controller 130 then displays the letter 'B' in the message display area 153.

Returning to FIG. 2, if a touch is sensed at step S220, the controller 130 performs symbol input (S240).

Hereinafter, step S240 is described in more detail with reference to FIGS. 5 and 6. Referring to FIG. 5, the controller 130 determines the key area 151 in which the touch is sensed (S510). In the example of FIG. 6, the key area 151 in which the touch is sensed is shown in FIG. 3 as the key area 151 containing the letter 'B'. The controller 130 then arranges symbols allocated to the touched key area 151 in a polygonal pattern (S515), as shown in FIG. 6. That is, when a touch is sensed, the controller 130 displays predetermined symbols instead of letters. The symbols may be set in each key area 151 by a user or by a manufacturer. The polygonal pattern may be a diamond-shaped pattern or a rectangular-shaped pattern.

The controller 130 then determines whether a touch-flick for inputting symbols is sensed (S520). If a touch-flick is sensed, the controller 130 determines a direction of the touch-flick (S525), and displays a symbol corresponding to the direction of the touch-flick on the message display area 153 (S530). Next, the controller 130 determines whether the symbol input is terminated (S535). If the symbol input is terminated, the controller 130 displays the letters allocated to the key area 151 in which the symbols were displayed in the key area 151 (S540).

Returning to FIG. 2, after input of letters at step S235 or symbols at step S240, the controller 130 determines whether the message input is terminated (S250). If the message input is not terminated, the controller 130 returns the process to step S220 and determines whether a touch or a touch-flick is sensed in the key area 151.

If the message input is terminated at step S250, by touching a confirmation key in the touch screen 140, the controller 130 performs a function selected by the user (S260). For example, when the message is to be transmitted, the controller 130 displays an input window for inputting a phone number. If the user inputs the phone number and the confirmation key in the touch screen 140, the controller 130 transmits the composed message to a terminal corresponding to the input phone number through the communication unit 110. Also, if the message is composed for storing a file, the controller 130 may set the composed message as a file title and store the file.

In the above description, when the message input mode is selected, letters are arranged in a polygonal pattern in the key area 151. However, letters may be arranged in the key area 151 in a polygonal pattern without selection of a specific mode, depending on the setting by a terminal manufacturer or a user.

Further, in the above description, when a user touches the key area 151, symbols allocated to the touched key area 151 are arranged in a polygonal pattern. However, symbols may be arranged in the key area 151 in a polygonal pattern when a user selects a symbol option through a menu or a function key.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for inputting a message in a terminal with a touch screen, the method comprising:
   arranging at least two letters allocated to a key area of the touch screen in a message input mode and displaying the letters in the key area;
   determining whether a touch-flick is sensed in the key area of the touch screen; and
   identifying, if the touch-flick is sensed, a letter arranged in the key area in a direction of the touch-flick and displaying the letter in a message display area.

2. The method according to claim 1, wherein the at least two letters allocated to the key area of the touch screen are arranged in a polygonal-shaped arrangement.

3. The method according to claim 2, further comprising:
   determining whether a touch is sensed in the key area of the touch screen;
   displaying, if a touch is sensed, symbols allocated to the key area in which the touch is sensed, in the key area;
   determining whether a touch-flick is sensed in the key area of the touch screen; and
   displaying, if a touch-flick is sensed, a symbol arranged in the key area in a direction of the touch flick, in a message display area.

4. The method according to claim 3, wherein the symbols allocated to the key area are arranged in a polygonal-shaped arrangement.

5. The method according to claim 1 further comprising:
   displaying, if a touch is sensed in the key area, symbols allocated to the key area in which the touch is sensed, in the key area; and
   displaying, if a touch-flick is sensed, a symbol arranged in the key area in a direction of the touch flick, in the message display area.

6. A terminal comprising:
   a touch screen configured to display a key display area and a message display area and sense a touch and a touch-flick, wherein the key display area displays a plurality of key areas, to each of which at least two letters are allocated, and the message display area displays letters selected from one of the key areas; and
   a controller configured to arrange the at least two letters allocated to the key area in a message input mode identify, if a touch-flick is sensed in the key area, a letter arranged in the key area in a direction of the touch-flick and instruct the touch screen to display, in the message display area, the letter.

7. The terminal according to claim 6, wherein the controller is further configured to arrange, if a touch is sensed, two or more symbols allocated to the key area in which the touch is sensed and displays the two or more symbols therein, and instruct, if a touch-flick is sensed in the key area, the touch screen to display, in the message display area, a symbol arranged in a direction of the touch-flick.

8. The terminal according to claim 7, wherein the controller instructs the touch screen to display the symbols allocated to the key area in a polygonal-shaped arrangement.

9. The terminal according to claim 6, wherein the controller arranges the at least two letters allocated to the key area in a polygonal-shaped arrangement.

10. A method for inputting a message in a terminal with a touch screen, the method comprising:
    arranging at least two symbols allocated to a key area of the touch screen in a message input mode;
    identifying, responsive to a touch-flick being sensed, a symbol arranged in the key area in a direction of the touch-flick; and
    displaying the symbol in a message display area.

11. The method according to claim 10, wherein arranging the at least two symbols allocated to the key area of the touch screen in the message input mode comprises:
    determining whether the touch is sensed in the key area of the touch screen; and
    arranging the at least two symbols in response to the touch being sensed.

12. The method according to claim 10, wherein the symbols allocated to the key area are arranged in a polygonal-shaped arrangement.

* * * * *